April 17, 1962 F. W. WIESLANDER ETAL 3,030,015
INVENTORY CONTROL SYSTEM
Filed Oct. 26, 1960 16 Sheets-Sheet 4
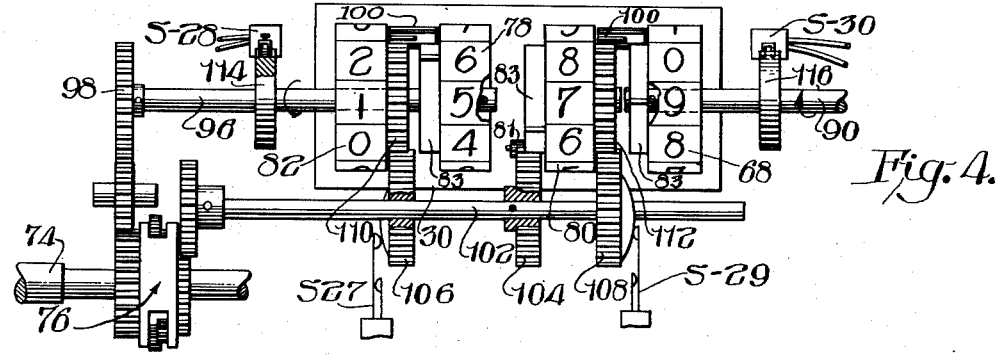
Fig. 4.
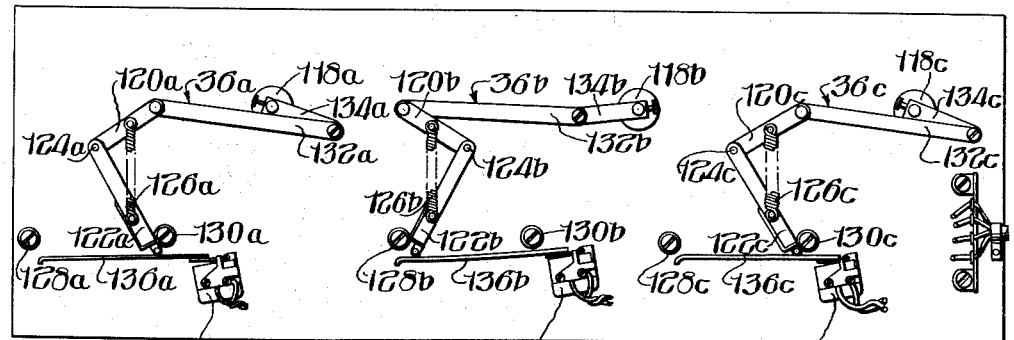
Fig. 6.
Fig. 7.
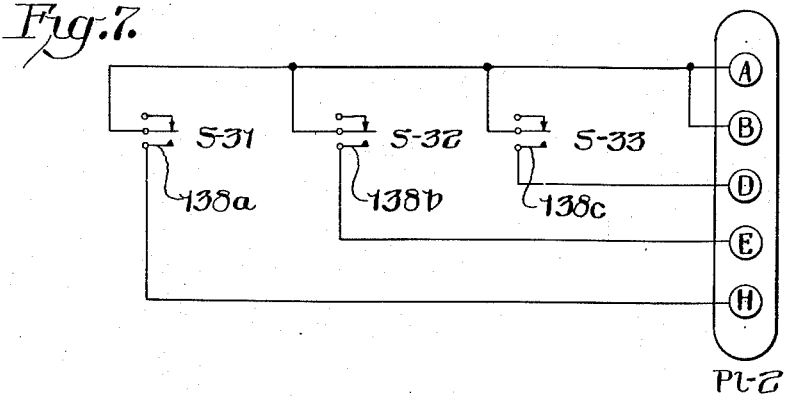

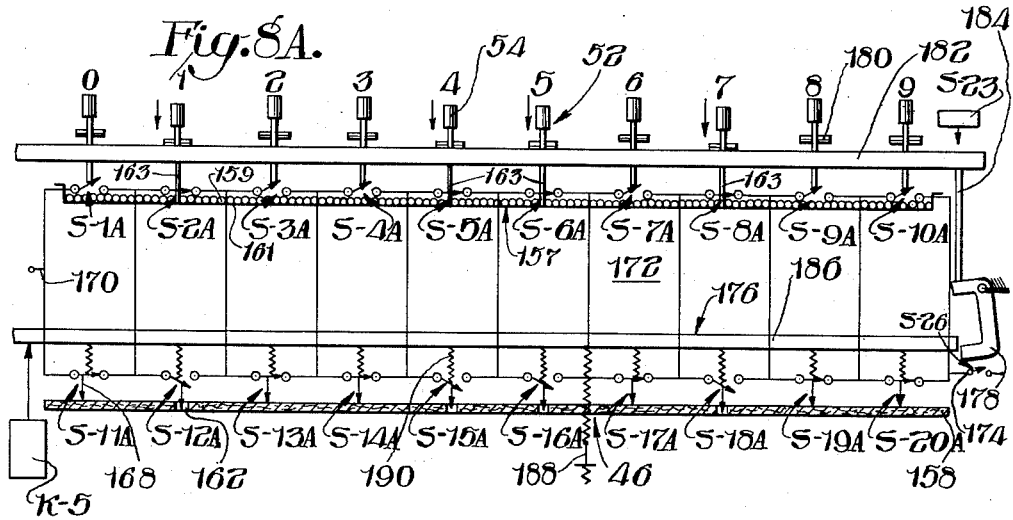

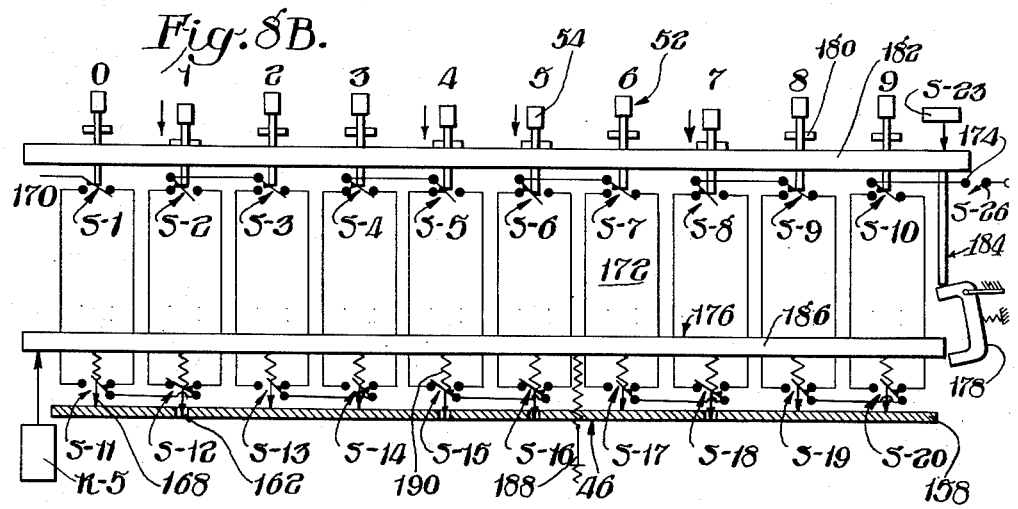
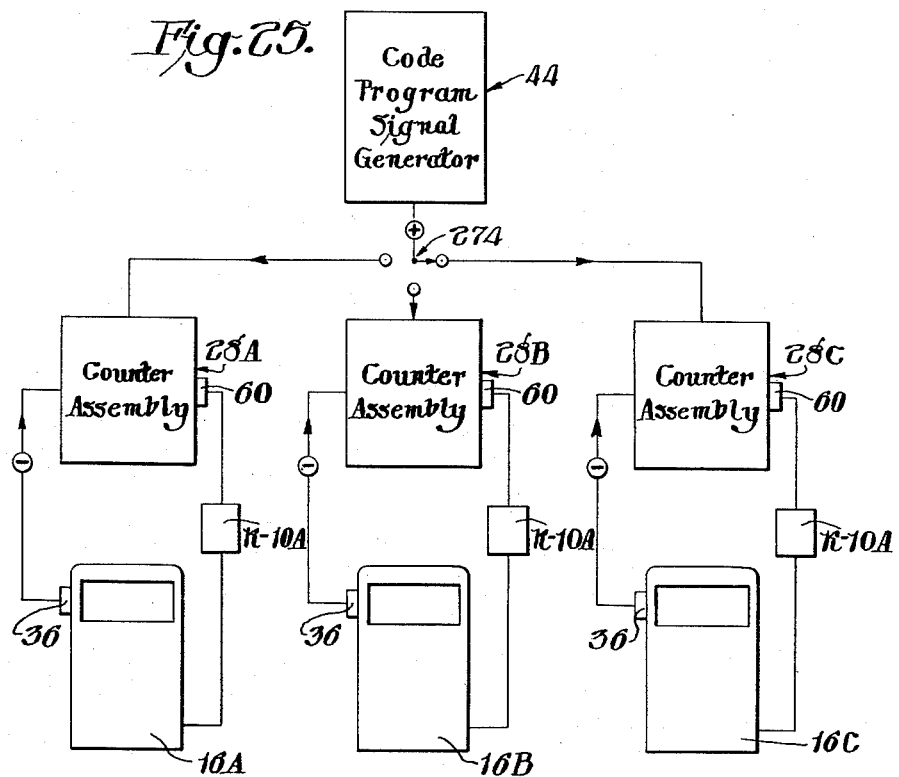

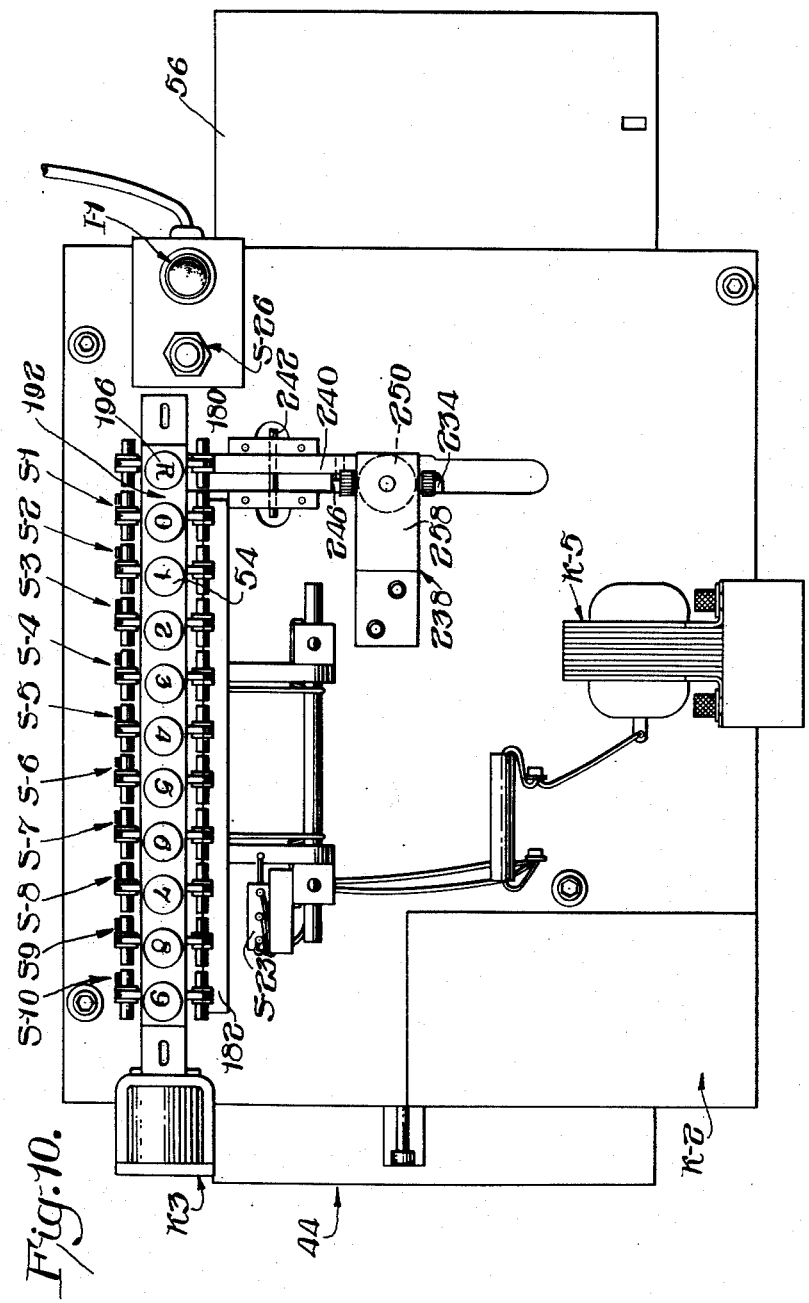

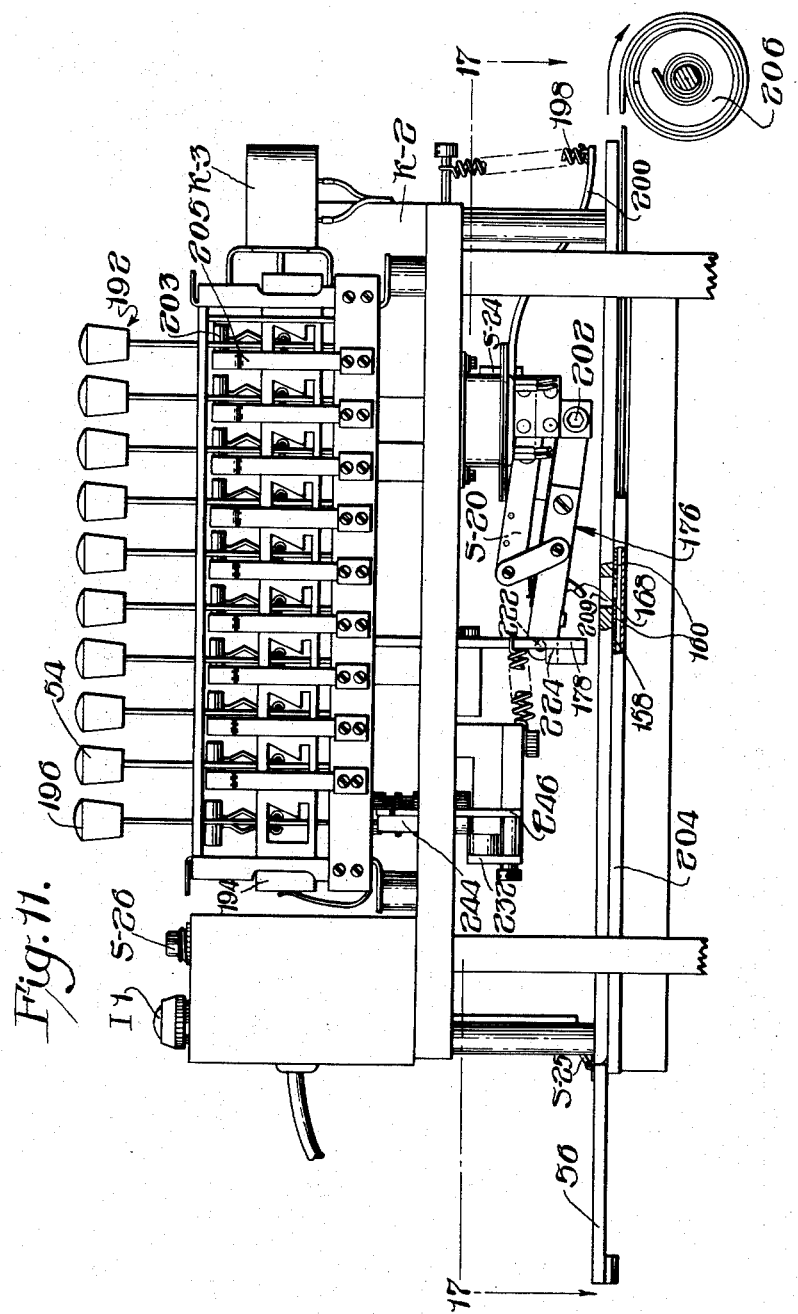

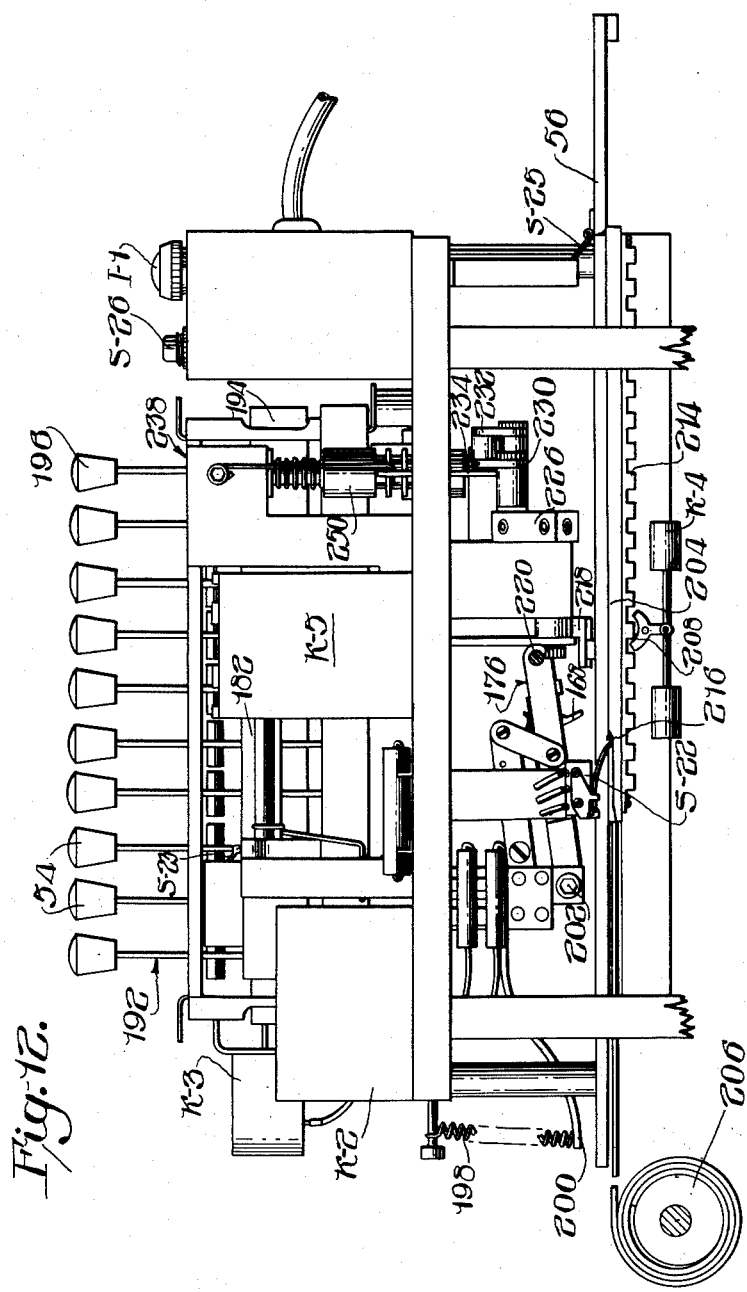

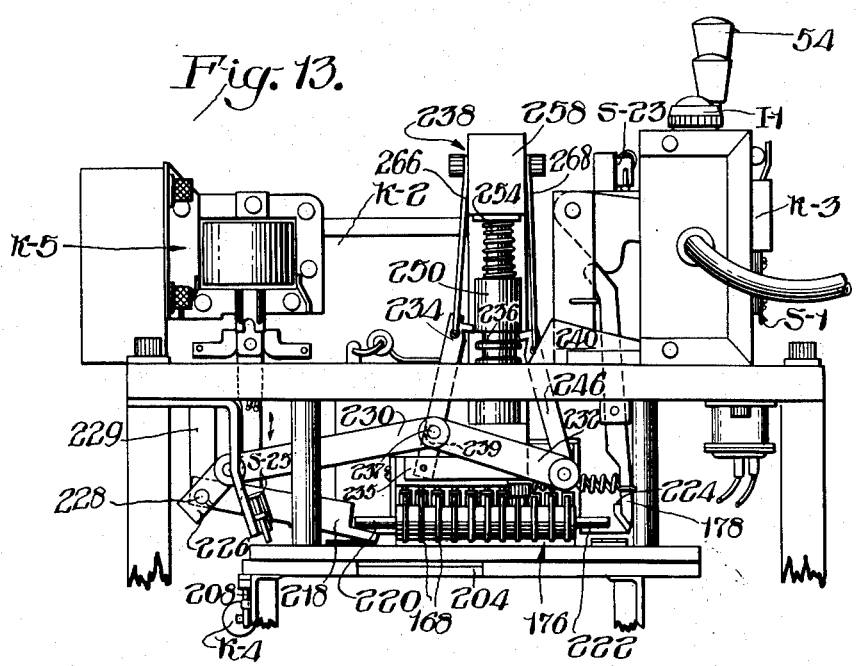
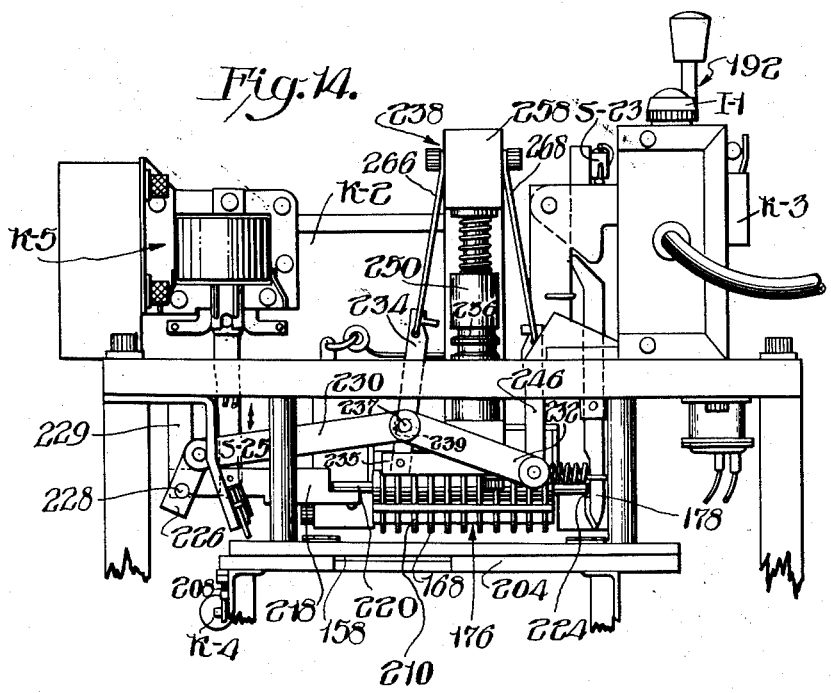

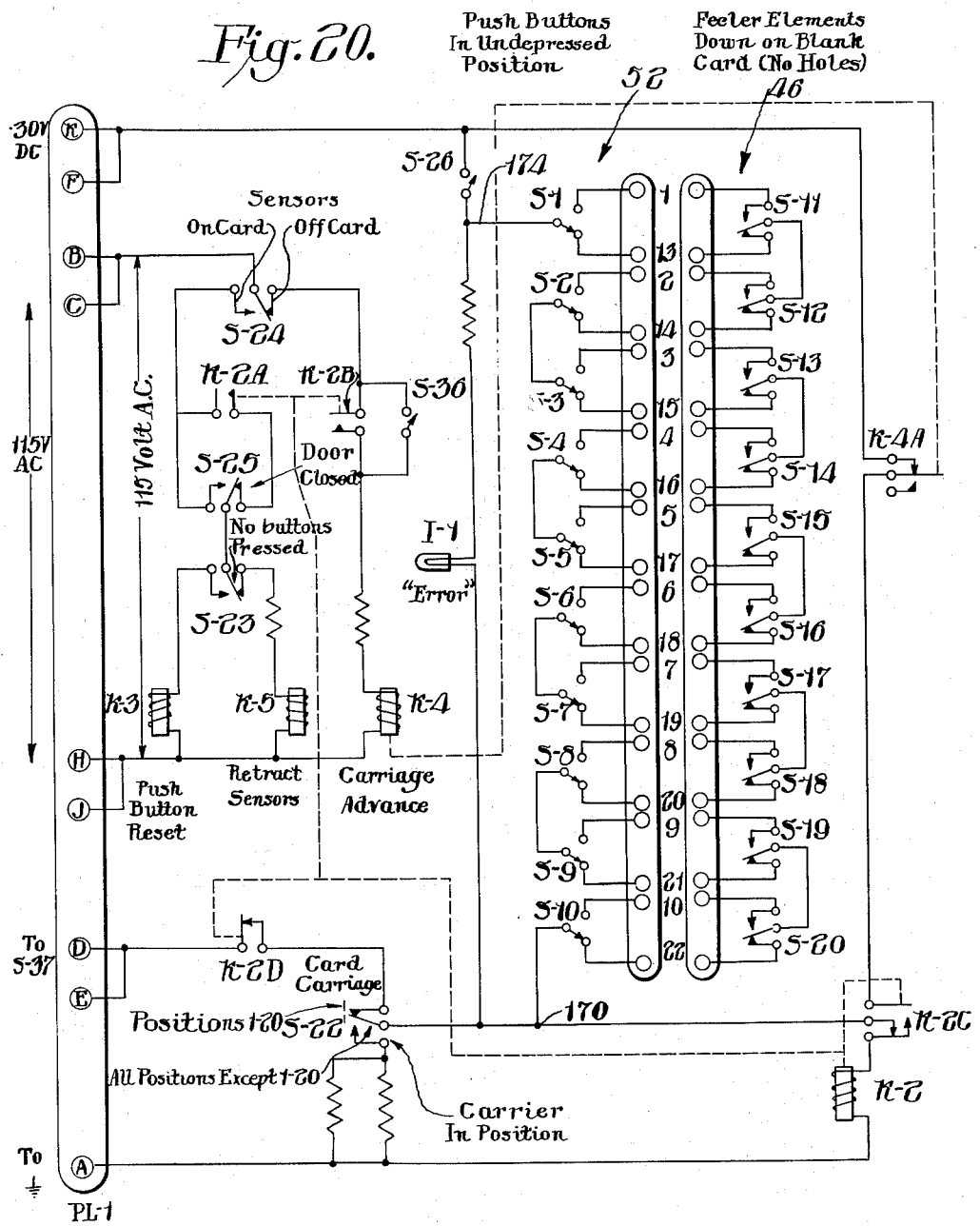

April 17, 1962 F. W. WIESLANDER ETAL 3,030,015
INVENTORY CONTROL SYSTEM
Filed Oct. 26, 1960 16 Sheets-Sheet 16
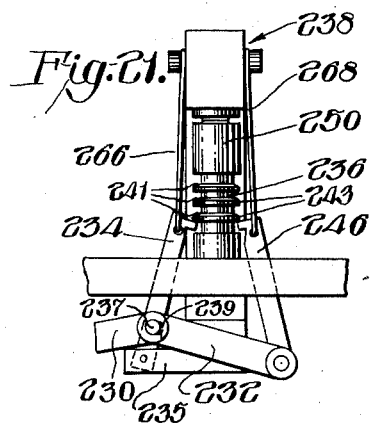
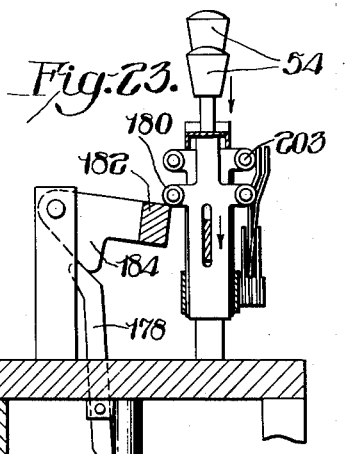
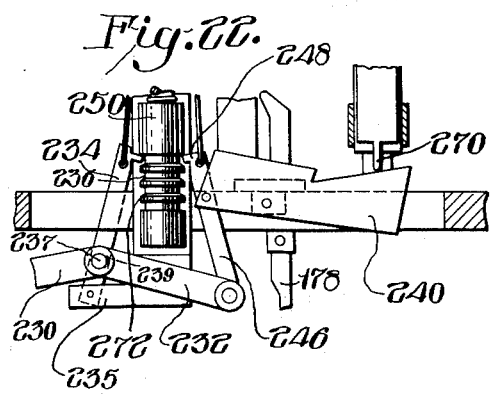
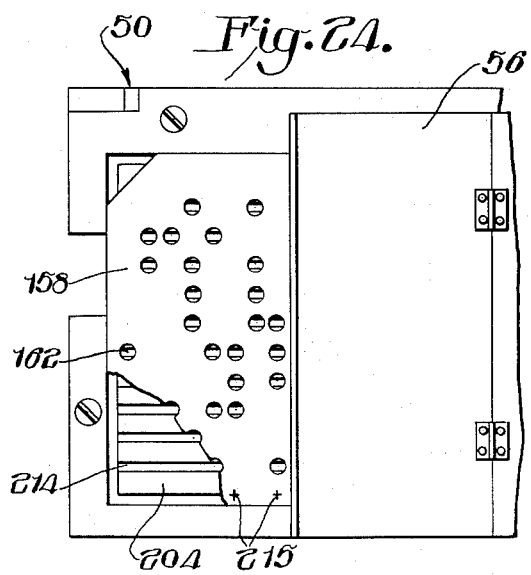

United States Patent Office 3,030,015
Patented Apr. 17, 1962

3,030,015
INVENTORY CONTROL SYSTEM
Frederick W. Wieslander and Edward L. Copony, Salisbury, Md., and William A. Davidson, Evanston, and Frederick D. Alexander and Jack V. Smith, Chicago, Ill., assignors, by direct and mesne assignments, to Symington Wayne Corporation, Salisbury, Md., a corporation of Maryland
Filed Oct. 26, 1960, Ser. No. 65,068
31 Claims. (Cl. 235—94)

This invention relates to a system for periodically making predetermined increments of fluid available for delivery from a supply; and it more particularly relates to such a system for periodically making predetermined amounts of gasoline in the storage tanks of a gasoline station available for dispensing by the station operator.

A gasoline distributor finds it advantageous to completely fill the storage tanks in a station each time a delivery is made to most economically schedule and utilize his transportation system. However, the credit standings of station operators are usually not substantial enough to merit entrusting them with full storage tanks of gasoline which may hold as much as 4,000 to 10,000 gallons, and distributors have, therefore, been forced to make frequent small deliveries on a cash basis which greatly increases their operating expenses. Systems have, therefore, been proposed to permit the distributor to maintain some control over the gasoline in the storage tanks of a gasoline station, and one of these systems is described in U.S. Letters Patent 2,247,480. However, this system and other systems subsequently proposed by others have not been as flexible as might be desired for various reasons such as being connected only to a particular dispenser of special construction, requiring pit installations which are easily flooded, or require the physical transportation of tokens or other physical objects from the distributor to the station operator for actuating the dispensers to deliver predetermined quantities. Furthermore, these systems usually require that a quantity previously made available be completely used up before an additional quantity is released, thereby necessitating shutdowns in station operation for reactivating the system which even of brief duration are still troublesome.

An object of this invention is to provide an inventory control system for controlling the release of predetermined amounts of fluid to dispensers from a supply which is flexible in operation, simple and economical in structure, and adaptable for connection to most any type of existing dispensing unit.

In accordance with this invention, a system for controlling the release of a fluid inventory in periodic increments such as one associated with a gasoline station includes a counter assembly incorporating a counting unit which is individually actuated by additive and subtractive input sections. Signal generators connected to the dispensers actuate the subtractive input section to subtract from the counting unit an indication of the quantity of fluid dispensed. A coded program signal generator is connected through its comparator stage to the additive input section of the counter assembly to actuate it to set into the counter an indication of the amount of fluid being made available for dispensing when its coded input stage is set to the same code pattern as that upon its code program stage. A detecting means ascertains when the counter is in a null condition, and it is connected with a disabling means for shutting off the dispensers when the counter is in a null condition. This system therefore, allows the dispensers to operate only when the additive quantity set into the counter from the coded program signal generator exceeds the quantities subtracted from the counter by the signal generators connected to the dispensers. However this system is flexible enough to release additional increments to the station operator at any time that he can establish credit even to the extent of making the entire amount in the storage tank immediately available, thereby avoiding any necessity to shut down the dispensers before releasing additional quantities.

The code program stage of the coded program signal generator automatically indexes to a successive number of code patterns sufficient in number to dispense the full amount of gasoline available in the storage tank in certain predetermined increments for each input code pattern. This requires the station operator to obtain a code pattern from the distributor before he can gain access to any of the predetermined increments of gasoline. This facilitates prompt and immediate release of whatever quantities the station owner requires whenever he can establish credit for them, and each individual transaction can be accomplished by a phone call.

Novel features and advantages of the present invention will become apparent to one skilled in the art from a reading of the following description in conjunction with the accompanying drawings wherein similar reference characters refer to similar parts and in which:

FIG. 4 is an enlargd view of the counting unit portion of the counter assembly shown in FIG. 3;

FIG. 6 is an enlarged view in elevation of the dispenser pulse generators indicated in FIG. 1 in various operative positions;

FIG. 7 is a schematic electrical diagram for the pulse generators shown in FIG. 6;

FIGS. 8A and 8B are alternative schematic diagrams of code input and comparator portions of the coded program signal generator of the embodiment shown in FIG. 1;

FIG. 9 is a plan view of a code sheet utilized in the embodiment shown in FIG. 1;

FIG. 10 is a plan view of the coded program signal generator shown in FIG. 1;

FIG. 11 is a view in elevation of the code input side of the coded program signal generator shown in FIG. 10;

FIG. 12 is a view in elevation of the opposite side to that shown in FIG. 11;

FIG. 13 is a view in elevation looking into the coded program signal generator from the carrier tray side of FIG. 10 when at least one push button has been depressed;

FIG. 14 is a view similar to FIG. 13 with no push buttons depressed;

FIG. 20 is a schematic electrical diagram for the coded program signal generator shown in FIGS. 10–19;

FIG. 21 is an enlarged view of the reset locking portion of the coded program signal generator in the locked phase of operation;

FIG. 22 is an enlarged view of the reset locking mechanism in its condition as it is actuated by downward movement of the reset button;

FIG. 23 is an enlarged view of a portion of the push button and latch release mechanism shown in FIG. 13;

FIG. 24 is a plan view of a portion of the coded program section; and

FIG. 25 is a schematic diagram of an embodiment of this invention which is adapted to handle several types of grades of fluids.

Figure 1:
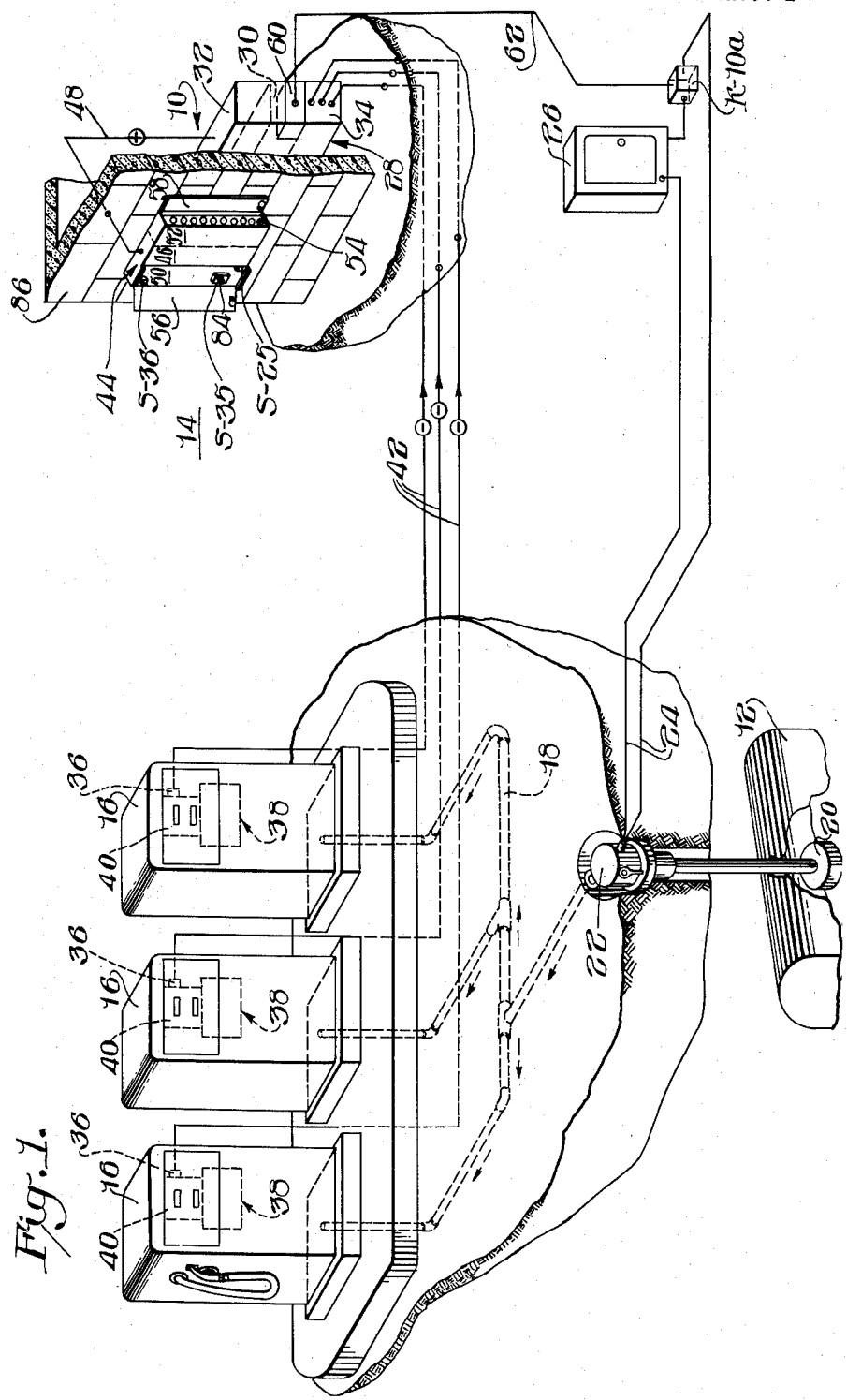
FIG. 1 is a perspective schematic diagram of one embodiment of this invention.

In FIG. 1 is shown an inventory control system 10 for controlling the release in portions of the gasoline inventory contained in a storage tank 12 of a gasoline station 14. This station dispenses gasoline through a number of dispensers 16 which are supplied by a piping system 18 which connects them with tank 12 through a pump 20 which is, for example, of the submerged remotely controlled type or each dispenser 16 may be of the conventional suction type. Supply piping 18 accordingly is connected to a header 22 through which electric power lines 24 are also inserted for energizing the submerged pump motor (not shown). Electric power lines 24 are supplied from a source of electric power 26, which is, for example a switch box; and a relay-operated switch K-10A is connected into electric power lines 24 for interrupting the power to the dispenser pumps and preventing them from operating after the total quantity of gasoline made available by this system has been dispensed.

A continuous record of the purchased gasoline in the storage tank available for dispensing is maintained by a counter assembly 28 including a bidirectional counting unit 30 which is separately actuated by additive input section 32 and subtractive input section 34. Signal generators 36 are connected to the variator or counter sections 38 of dispensers 16, for example, by connection to shafts 118a, b and c shown in FIG. 6 upon the variator or counter portions 40 of the dispenser computing sections 38. Dispenser signal generators 36 are later described in detail, and their output signal pulses are provided through electric signal lines 42 to subtractive input section 34 of counter assembly 28.

A coded program signal generator 44 is connected through its comparator stage 46 by signal line 48 to additive input section 32 of counter assembly 28 to actuate it to read into counter unit 30 an indication of the amount of gasoline which is made available for dispensing by each incremental purchase of the gasoline in storage tank 12. Coded program signal generator 44 also includes a code program stage 50 and a code input stage 52 which are connected with each other through comparator stage 46. When code input stage 52 is set, for example by depression of a predetermined pattern of push buttons 54, to a code which matches that which is being currently presented by code program stage 50, comparator 46 sends a signal to additive input section 32 which causes it to set counter unit 30 ahead an amount equal to a predetermined purchased quantity increment such as, for example, 300 gallons of gasoline.

Coded program signal generator 44 includes, for example two lockable doors 56 and 58 respectively sealing code program stage 50 and code input stage 52. Door 56 over the program stage can only be opened by a representative of the distributor such as the gasoline supply truck driver, and door 58 can be opened by either the truck driver or station operator. This permits the truck driver to set the code program for stage 50 whenever tank 12 is filled, and to test the proper operation of the generator by test actuation of code input section 52. The station operator has a key to permit him to obtain access to input stage 52 which is locked to prevent tampering by the public, and to set in the code pattern which he obtains, for example, by phone from the supply company dispatcher when his credit status entitles him to this information. Each time the operator has enough credit to purchase an increment of gasoline, such as 300 gallons, he can obtain his next code in the program from the company dispatcher and set it into the input stage 52 by operation of push buttons 54 to cause comparator stage 46 to actuate additive input section 32 to run counter unit 30 ahead by the purchased amount.

A detecting unit 60 is also incorporated in counter assembly 28, and it is connected to counter unit 30 to permit it to ascertain when counter unit 30 is in a null condition. Detector 60 is connected to disabling switch K-10A through signal lines 62 to permit it to cut off power to the remote dispenser pump 20 or to all the dispensers in a conventional dispensing system when counter unit 30 is in the null condition. Whenever the amount added into counter 30 by additive input section 32 is used up, detector 60 will then disable dispensers 16, for example, by cutting off power to pump 20.

Figure 2:
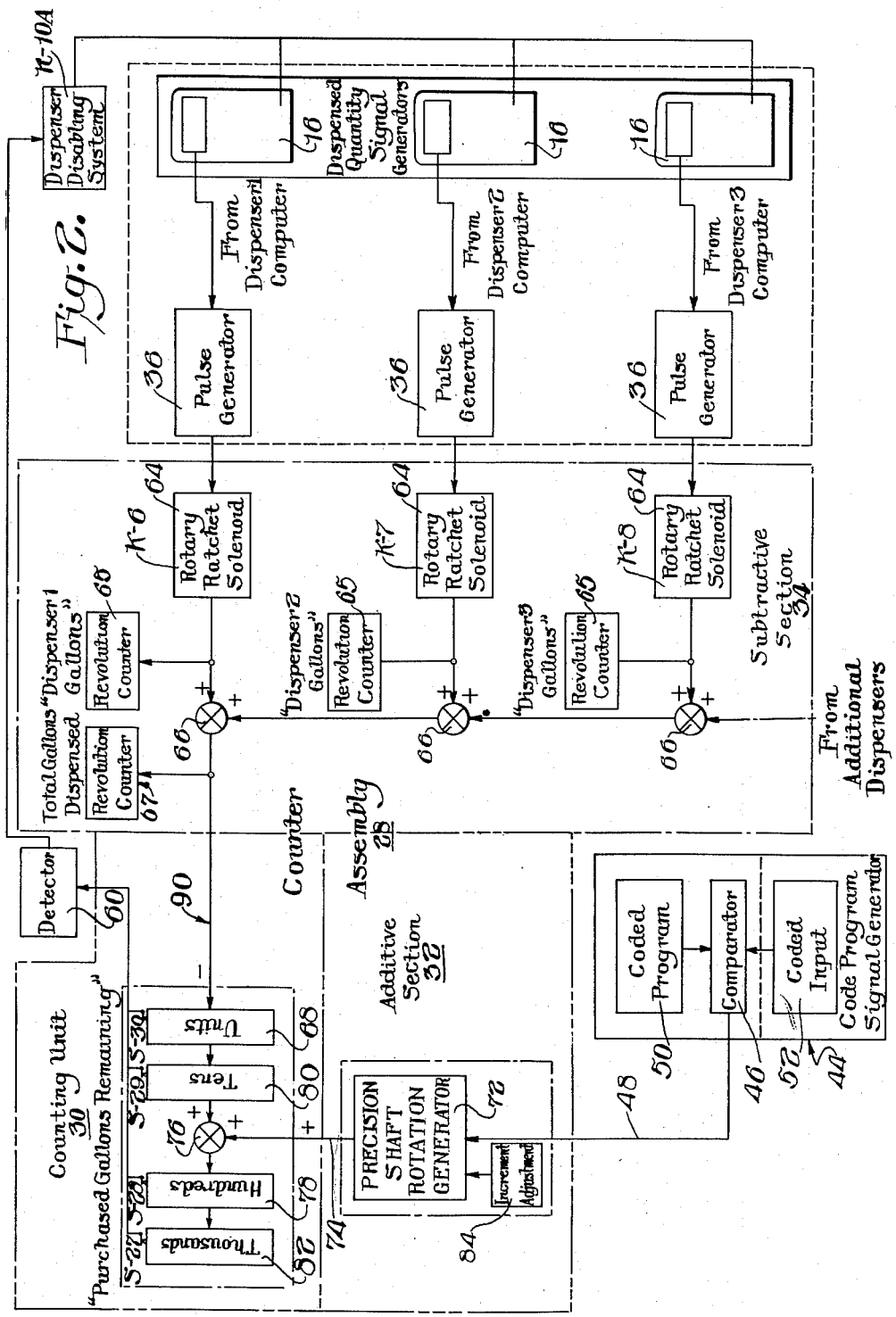
FIG. 2 is a block schematic diagram of the embodiment shown in FIG. 1.

FIG. 2 shows in schematic form the mode of interconnection of the same units shown in FIG. 1 in a slightly different manner, and only portions which are significantly different from those shown in FIG. 1 are specifically discussed. FIG. 2 in particular shows in greater detail the mode of connection of counter unit 30 which is later described in even greater detail to indicate more clearly its structural features. FIG. 2 also shows that the subtractive input from signal generators 36 actuates movement of rotation generators 64 within counter assembly 28. These rotation generators 64 are, for example, rotary ratchet solenoids which are a conventional electrical component which generate a predetermined angular movement in response to a pulse input. They are, for example, similar to the stepping switch shown in U.S. Patent 2,935,586, but even more simple versions of that type of switch may be utilized. The rotational movements from rotary ratchet solenoids 64, which are indicated on revolution counters 65, are added to each other through mechanical differentials 66 and indicated on summing revolution counter 67. This total rotational sum is transmitted to counter unit 30 through shaft 90 and drives units wheel 68 in a subtractive sense. The input from dispensers 16, therefore, subtracts from counter unit 30 the total amount of gasoline that has been dispensed.

An additive input is provided to counter unit 30 through additive section 32 of counter assembly 28 from another rotation generator 72 which is, for example, described as a precision shaft rotation generator which is provided, for example, by a stepping switch of conventional form which generates a predetermined angular output in response to an actuating signal provided through signal line 48 from comparator stage 46 of coded program signal generator 44. This switch is, for example, similar to that described in U.S. Patent 2,935,586. The output from rotation generator 72 is provided through a mechanical transmission 74 and through a differential 76 in an additive sense to a portion of counter unit 30 which is, for example, the hundreds wheel 78 for reasons later explained. At this time the output from tens wheel 80 of counter unit 30 is entered in a subtractive sense through differential 76 into hundreds wheel 78 and thousands wheel 82 to subtract from counting unit 30 the amount of gasoline dispensed. In this manner the counter 30 will always indicate the purchased gallons of gasoline remaining which are available for being dispensed.

Detector unit 60 is shown connected to counting unit 30 by detecting switches S-30, S-29, S-28 and S-27 which are respectively associated with the units, tens, hundreds and thousands wheels of counter unit 30 for providing a signal to detector 60 for disabling dispenser 16 when all of these wheels are in a null or a zero condition.

An increment adjustment section 84 which is, for example, a set of gang switches S-35A-L (FIG. 5) operated by a selector S-35 (FIG. 5) is connected to stepping switch rotation generator 72 for varying its rotational output in response to input signals. This permits presetting the number of gallons to be added into counter 30 for each code input thereby permitting the station owner to purchase the preset quantity for each code input in keeping with his particular requirements. These increments are, for example, variable from 100, 200, 300, 400 or 600 gallons per purchase by adjustment of an increment adjustment section 84 which is, for example, mounted within door 56 upon the coded program stage thereby permitting its convenient adjustment by the tank truck driver when he sets the program. Furthermore, coded program signal generator, as shown in FIG. 1, is mounted up on an outside wall 86 of the station to permit access by the driver at all times since gasoline deliveries are most conveniently made at night during off-peak traffic hours. However, counter assembly 28 is conveniently mounted within wall 86 to permit easy viewing by the station operator. Power unit 26 and relay operated switch K-10A would be sealed to prevent tampering and may be mounted in any convenient place. This generally describes the overall system, and various aspects of this system are more particularly described in the following in discussing the other figures of the drawing.

Figure 3:
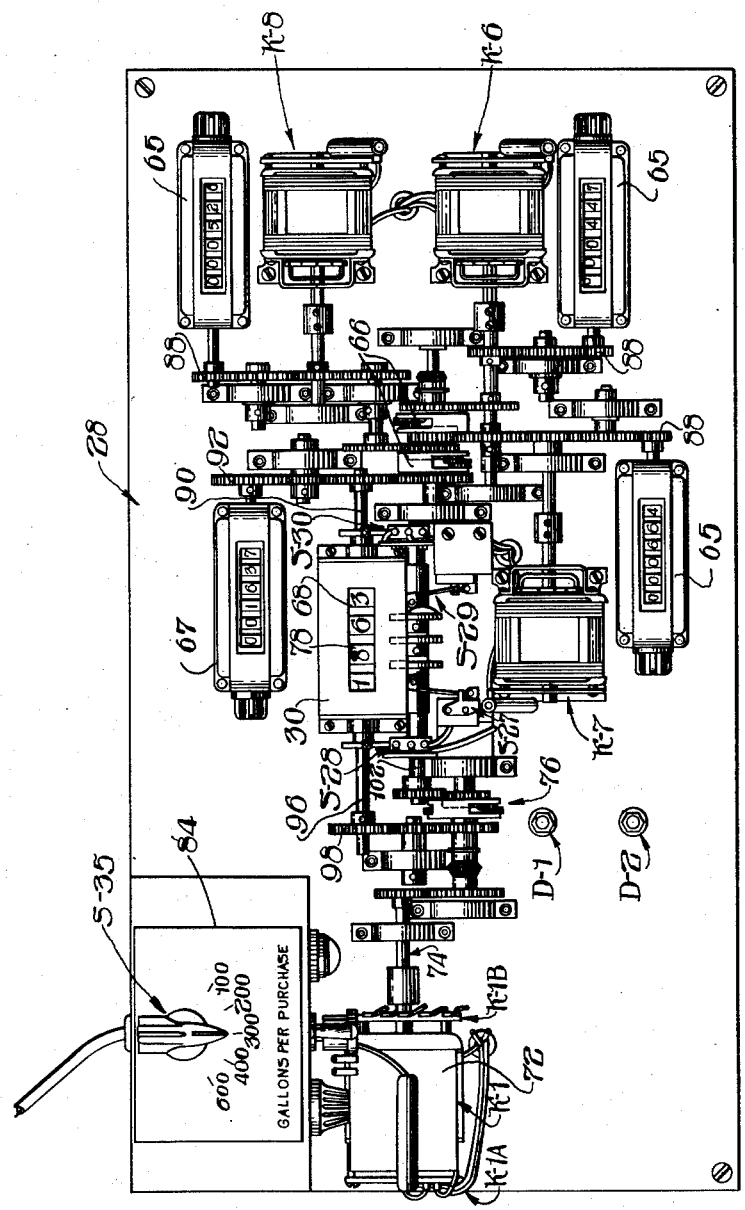
FIG. 3 is a plan view of the counter assembly portion of the embodiment shown in FIG. 1.

FIGS. 3 and 4 respectively show an illustrative physical arrangement for counter assembly 28 and counting unit 30. In FIG. 3 are shown rotary ratchet solenoids K-6, K-7 and K-8 respectively connected to signal generators 36 in dispensers 16. The outputs from rotary ratchet solenoids K-6, K-7 and K-8 are each connected through gear transmissions 88 to individual counters 65 which show how much gasoline has been dispensed from each of dispensers 16. The outputs from the rotary ratchet solenoids are fed through additive differentials 66 into summing shaft 90 which is connected in a manner shown in FIG. 4 to units wheel 68 of counting unit 30. Summing shaft 90 is also connected through a gear transmission 92 to a master counter 67 which displays the sum of the gallons dispensed from all dispensers 16. Also in FIG. 3 is shown stepping switch or rotation generator 72 which is additively connected through a differential 76 to the hundreds wheel 78 of counter unit 30 as shown in greater detail in FIG. 4. This permits a multiple hundreds unit input to be read into counting unit 30 with relatively slight rotation of its whole mechanism, as compared with adding through the unit wheel only, thereby minimizing the time and wear resulting from additive inputs to the unit wheel and simplifying the counting unit. This is accomplished through shaft 96 connected to differential 76 through gearing 98 and which runs through the hollow center of thousands wheel 82 into connection with hundreds wheel 78 as shown in FIG. 4 in more detail. Carry-over from hundreds wheel 78 to thousands wheel 82 is accomplished through a conventional transfer gearing arrangement 100.

The subtractive input shaft 90 is directly connected to units wheel 68, and the carry-over from units wheel 68 to tens wheel 80 is accomplished through a conventional transfer gear 100. However, the transfer output of tens wheel 80 instead of being connected to hundreds wheel 78 directly, as is normal, is connected to outboard shaft 102 through auxiliary gear 104 which meshes with transfer pinion 81 driven by the one or two tooth transfer gear 83 on tens wheel 80. This gear 104 is pinned to shaft 102. Outboard shaft 102 is subtractively connected into differential 76; and it, therefore, subtracts the output of tens wheel 80 from hundreds wheel 78. The net effect of this gearing arrangement is that of making all four digits of the counter operate in a normal manner with respect to rotation of shaft 90, while permitting rotation of shaft 74 to affect the indications of only the hundreds 78 and thousands 82 digits.

The unit and tens unit wheels always rotate in a downcounting direction. The hundreds unit and thousands unit wheels run in an upcounting direction when actuated by rotation of shaft 72, and they downcount when actuated by the transfer of the downcounting tens wheel through shaft 102 etc.

The null or zero positions of the counting wheels are detected by switches S-27, S-28, S-29 and S-30. As shown in FIG. 4, switches S-27 and S-29 respectively ascertain the angular positions of thousands wheel 82 and tens wheel 80 by engagement of cammed gears 106 and 108 with gears 110 and 112 coaxially connected to the thousands and tens wheels. Cammed gears 106 and 108 rotate loosely about outboard shaft 102 which merely provides a convenient rotational support for them. The angular positions of hundreds wheels 78 and units wheel 68 are respectively detected by cams 114 and 116 secured to input shafts 96 and 90 upon which the detecting arms of switches S-28 and S-30 ride. Switches S-27, S-28, S-29 and S-30 are connected in a manner later described to disable dispensers 16 via K-10 whenever all of the wheels of counter 30 are in their zero positions which accordingly shuts off the dispensers when all of the increments purchased and set into counting unit 30 have been dispensed. In addition, the arrangement of switches S-27 and 28 also provides for lighting a warning light (I-4) when less than 100 gallons remain on the counter 30.

Figure 5:
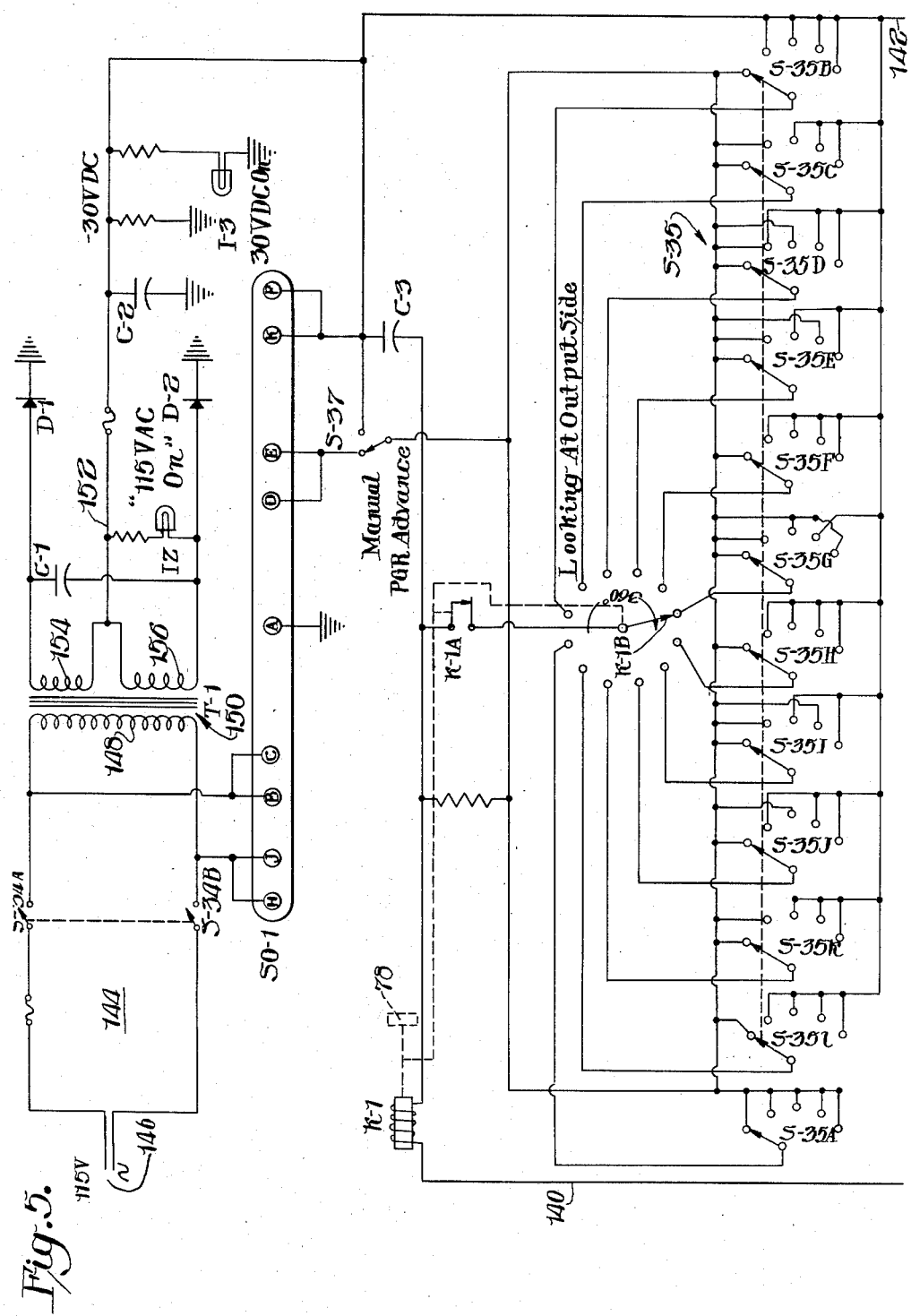
FIGS. 5 and 5A are conjugate portions of an electrical schematic diagram for the counter assembly shown in FIG. 3.
Figure 5A:
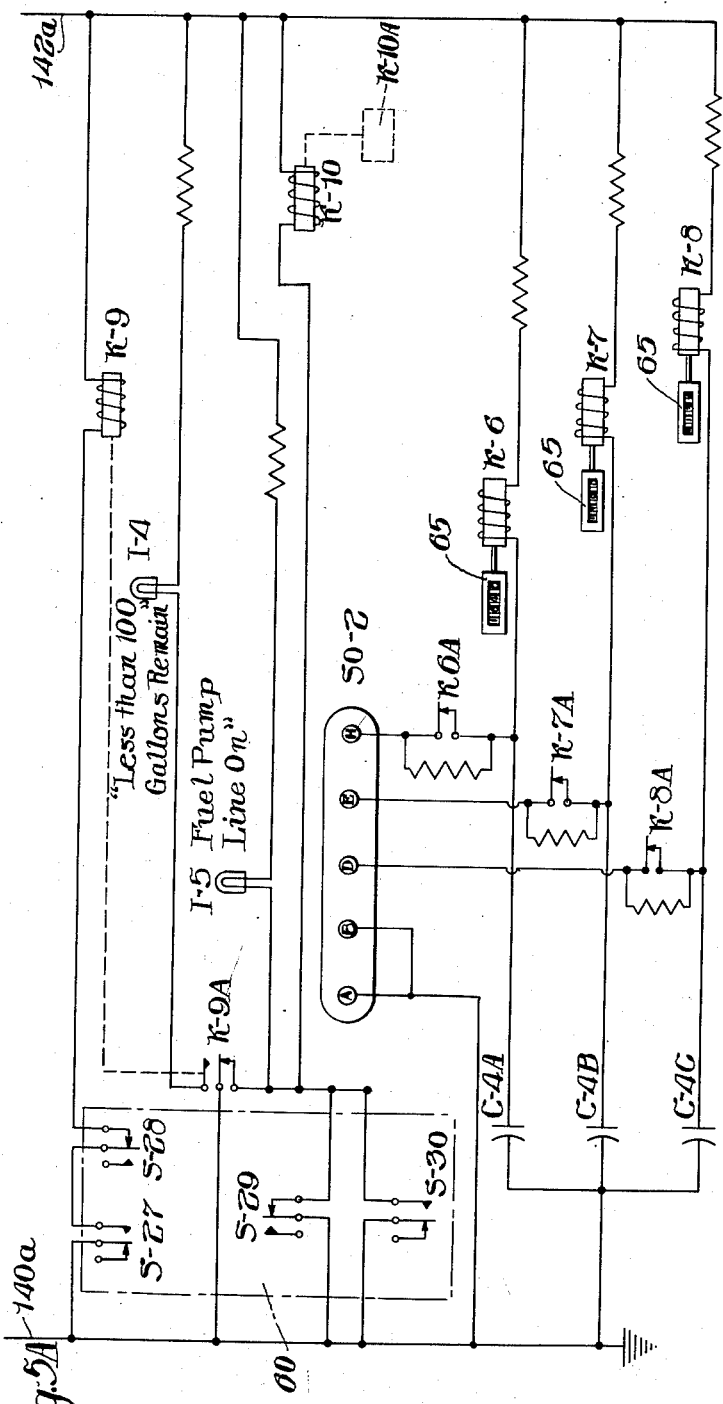
Figure 15:
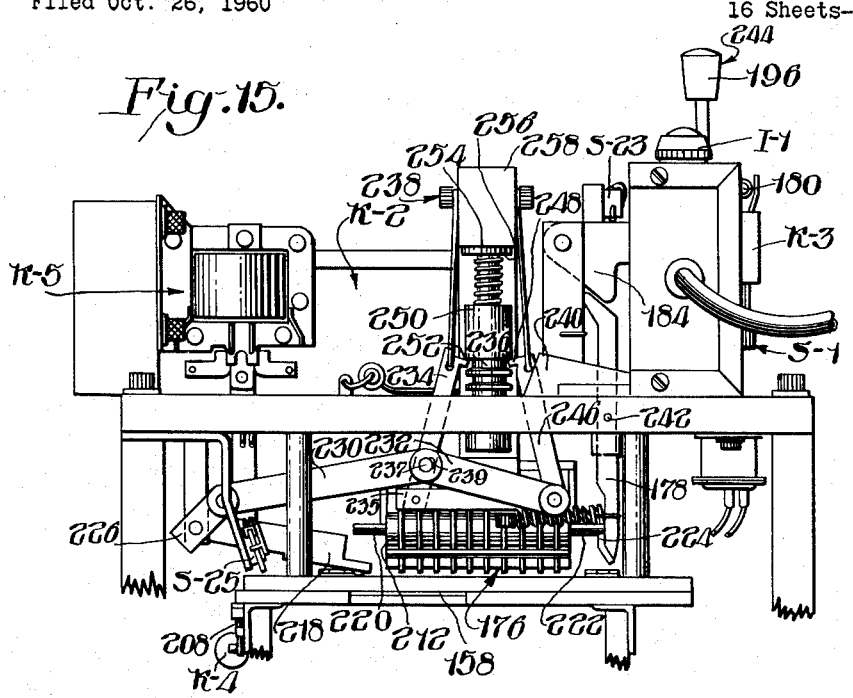
FIG. 15 is a view similar to FIG. 13 with the reset button being operated.
Figure 16:
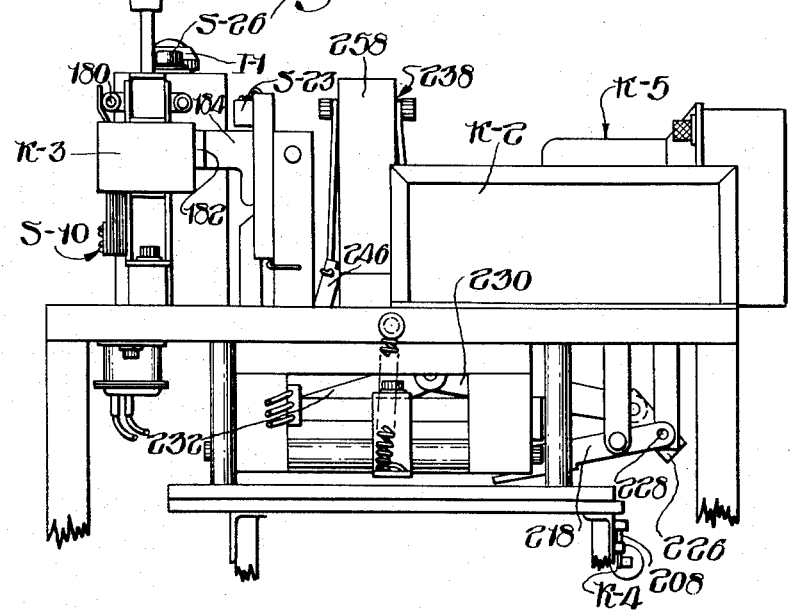
FIG. 16 is a view in elevation of the opposite end of the coded program signal generator to that shown in FIG. 13.

In FIGS. 5 and 5A are shown two portions of a schematic electrical diagram for counter assembly 28 which should be read side-by-side with the ends of electrical lines 140 and 142 of FIG. 5 joined to ends of electrical lines 140a and 142a of FIG. 5A. This combined electrical diagram includes various parts already indicated in FIGS. 1-4, and the functions of the described parts will be clarified by their illustrated mode of electrical connection. In FIG. 5 is shown a power supply 144 in which 115 volt A.C. is fed from power line 146 into primary winding 148 of transformer 150. A full wave rectified minus 30 volt D.C. output is obtained from a center tap 152 located between secondary windings 154 and 156 of transformer 150 and ground. This minus 30 volt D.C. output is fed to the control circuit in a manner which is shown on schematic FIG. 5.

FIG. 5 also shows coil K-1 which is the drive coil of a twelve-position stepping relay or stepping switch 72 whose mechanical output is connected to hundreds wheel 78 as previously described. The interrupter contact for drive coil K-1 is designated K-1A which opens when coil K-1 is energized; and the control deck for coil K-1, designated K-1B, rotates one position each time that K-1 is deenergized.

Detector 60 as previously described includes detector contacts S-27, S-28, S-29 and S-30. Contacts S-27 and S-28 are connected in series with relay solenoid K-9, and the normally-closed portion of contacts K-9A are connected in a parallel arrangement with contacts S-29 and S-30 to deenergize relay solenoid K-10 and open the power circuit to the pump motors when all of the switches determine that the counter wheels are in a null or zero condition. Solenoid K-10 is normally energized until the previously mentioned detector contacts are in the null position. As long as one of the detector switches is not in the null condition, solenoid K-10 will not be deenergized, and power to the pump motor circuit will be maintained. However, switches S-27 connected to the thousands wheel and S-28 connected to the hundreds wheel are connected to each other in series to actuate solenoid K-9 to throw switch K-9A into contact with the line including indicator lamp I-4 to show that less than 100 gallons are remaining when both the thousands and hundreds wheels are in the null condition as shown in FIG. 5A. Should remaining switches S-29 and S-30 also assume the null condition, this shuts off power to the pump by deenergizing solenoid K-10 as previously described.

The summed outputs of rotary ratchet solenoids K-6, K-7 and K-8 provide rotational outputs through shaft 90 in a subtractive direction to the counter unit 30 and in an additive direction to totalling revolution counter 67 shown in FIG. 2, as previously described. The break contacts for these rotary ratchet solenoids are designated K–6A, K–7A and K–8A.

Control deck K–1B of stepping relay K–1 is connected through selector switch S–35 to energize its drive solenoid. Selector switch S–35 is a six-gang, twelve-pole, five-position selector switch whose contacts are wired to K–1B to provide various rotational inputs into counter unit 30. In this example, the five selectable inputs are 100, 200, 300, 400 and 600 gallons per purchase as indicated on the selector switch dial in FIG. 3.

FIGS. 6 and 7 respectively show a possible mechanical arrangement of dispensed quantity signal generators 36a, 36b and 36c and the electrical connection of switches S–31, S–32 and S–33 connected therewith. These signal generators are, for example, mechanical toggle-action pulse generators which generate two pulse signals each time that computer shafts 118a, 118b and 118c rotate 360°. Shafts 118a, 118b and 118c are geared to a gallon shaft in the variator counter section to permit ½ revolution of rotation of shafts 118a, 118b and 118c every time a gallon is dispensed from its respective dispenser. Units 36a, 36b and 36c are shown in positions which illustrate a complete cycle of rotation of any of shafts 118, and the fact that these units are of the toggle-action type prevents switches S–31, S–32 and S–33 from remaining closed should the dispensers stop in any condition of their rotational cycle. Each of these units, therefore, includes a pair of links 120 and 122 which are jointly pivoted at one end upon a pivot 124. Remote portions of these arms 120 and 122 are connected by a tension spring 126 which pulls them towards each other whenever they pass an exactly aligned condition. The resilient movement of these links together is arrested by stops 128 and 130 arranged on opposite sides of pivot 124, and the end of arm 120 is rotatably connected to connecting rod 132 which itself is connected to crank 134 secured to shaft 118 geared as before-mentioned to a gallon shaft in the variator or computer section. Rotation of crank 134, therefore, causes arm 122 to be snapped from one of stops 128 and 130 to the other, and in so doing to momentarily actuate switch arm 136 of switches S–31, S–32 and S–33 to send a pulse to its respective solenoid, K–6, K–7, and K–8 each time a gallon of fuel is dispensed from its corresponding dispenser. In FIG. 6 toggle signal generator assembly 36a has arm 122a lying against stop 130a. Toggle generator 36b has arm 122b snapped against stop 128b for a condition of crank 134b 180° removed from crank 134a. Finally toggle generator 36c has arm 122c back in the same condition as arm 122a lying against stop 130c. These are the only positions that arm 122 can occupy because of its toggle connection, and this prevents any of switches S–31, S–32, and S–33 from being maintained in the "on" condition through which it snaps during the traverse of arm 122 from one extremity of travel to the other. FIG. 7 shows the electrical connection of normally-open contacts 138a, 138b and 138c when arm 122 is at either extremity of travel and this contact is momentarily closed during the snap action of arm 122 along switch arm 136 in either direction of travel.

In FIG. 8A is shown a schematic diagram of illustrative code input 52 and comparator stages 46 of coded program signal generator 44. It does not include the circuit shown in FIG. 20 which simplifies the electric circuit; and it, therefore, must include a limiting device 157 having a number of balls 159 with space between them allowed by the end wall of race 161 only sufficient to reive the stems 163 of four push buttons 54. This permits only four push buttons 54 to be simultaneously depressed. A limiting device of this sort is described in greater detail in U.S. Patent No. 2,935,577. However, the circuit illustrated in FIG. 8B is the same as that shown in FIG. 20, and a limiting device is not required to make it operative as is later described.

FIG. 9 is a plan view of a punched code sheet or card 158 including rows 160 of indicia which are, for example, numbers from 0 to 9. There are twenty-one rows including one test and twenty input rows, and four holes 162 are punched on each of the rows to provide code patterns which must be matched by the code set into push buttons 54 of code input stage 52 to cause comparator 46 to send a triggering signal to precision shaft rotation generator 72 of the additive input section 32 of counter assembly 30. A corner 164 is notched or an edge 166 is cut at an angle to insure that sheet or card 158 is properly oriented within an indexing carriage which is later described. The general scheme of operation of the code input and comparator stages in conjunction with card 158 is generally described in FIGS. 8A, 8B and 20.

FIG. 8A indicates that push buttons 54 are associated with normally-opened series-connected contacts S–1A and S–10A. Furthermore, series-connected normally closed contacts S–11A to S–20A are connected in parallel with successive contacts S–1A to S–10A. Contacts S–1A to S–10A are closed by pressing down associated push button 54. In FIG. 8A push button positions 1, 4, 5 and 7 are depressed closing contacts S–2A, S–5A, S–6A and S–8A. When any one of the push buttons 54 is pressed, it is locked down mechanically until reset. Normally-closed contacts S–11A to S–20A are allowed to open when their associated feeler elements, diagrammatically illustrated by arrows 168, transit through holes 162 in card or sheet 158. In FIG. 8A contacts S–12A, S–15A, S–16A and S–18A are opened. Since push buttons 54 corresponding to these closed contacts have been closed, the circuit from terminal 170 at one end of circuit 172 to terminal 174 at its other end is completed. This illustrates the condition when the code input pattern of push buttons 54 corresponds to the code pattern established by the row of coded sheet 158 being read by feelers 168 of comparator 46. Unless all four push buttons 54 corresponding to switches S–12A, S–15A, S–16A and S–18A are depressed, the circuit, which is opened by related switches S–2A, S–5A, S–6A and S–8A, will remain open; and the comparator 46 cannot be actuated to send a pulse to the additive input section of the counter unit. Limiting device 157 prevents any more than four buttons 54 from being depressed. Otherwise all of them could be pushed to close all portions of the circuit which might be opened by switches S–11 through S–20.

In FIG. 8B, push buttons 54—0 to 9, which are respectively associated with switches S–1 to S–10, are wired in series with switches S–11 to S–20. No letter suffixes are used relative to FIG. 8B since it is the same as the circuit shown in FIG. 20. Buttons 54 lock down mechanically until reset. Furthermore, switches S–1 to S–20 are S.P.D.T. momentary type. Stationary contacts of S–1 are in parallel with stationary contacts of S–11 and S–2 with S–12, etc. All of the parallel pairs are then connected in series with each other by connecting the arm of S–11 to the arm of S–12, the arm of S–2 to the arm of S–3, etc. Normal position for S–1 to S–10 shall be with push buttons 54—0 to 9 in the up or undepressed position (FIG. 20). Normal position for S–11 to S–20 shall be with feeler elements down on a blank card (no holes) FIG. 20. In FIG. 8B, push buttons 54—1, 4, 5 and 7 are depressed transferring S–2, S–5, S–6 and S–8 from normal position. Card 158 is in carrier and placed in position 7, holes 162 allow feeler element associated with S–12, S–14, S–15 and S–18 to be transferred from normal position. Since push buttons 54 corresponding to these transferred switches S–12, S–14, S–15 and S–18 are depressed; the circuit from terminal 170 at one end of circuit 172 to terminal 174 at its other end is completed. When verification switch S–26 is closed, the circuit is completed to initiate counting functions K–1, etc. Should any other button be pushed not corresponding to the punched code, the circuit from terminal 170 to 174 will be broken. The series-connected parallel pairs of switches of FIG. 8B, therefore, do not require a limiting device similar to 157 of FIG. 8A because the actuation of a wrong button 54 opens the circuit through one of the pairs. This also permits variation in the number of holes pierced in the card to increase the odds against guessing the correct combination.

FIGS. 8A and 8B also show in a schematic fashion that all of the spring-loaded feeler elements 168 are dropped into contact with the surface of card 158 when any of push buttons 54 are depressed to release sensor or feeler assembly 176 from latch 178 by contact of push button projections 180 onto bar 182 which releases latch 178 through contact of bar extension 184. Feeler assembly support 186 is resiliently urged towards the surface of card 158 by tension spring 188, and each individual feeler unit 168 is resiliently supported by springs 190 to allow them to resiliently bear against the surface of card 158 and drop through any hole 162 with which they register.

When comparator circuit 172 is actuated, this energizes relay solenoid K–2 which closes its contact K–2A to energize relay K–5 through S–23 and S–25 and resets the push buttons 54 by energizing relay K–3. This lifts feeler support bar 186 to lock it within latch 178. Switch S–23 as is later described, is actuated when any of push buttons 54 is depressed. It is shown in the electrical diagram of FIG. 20 in the position that it assumes when all push buttons are in the undepressed position, and it transfers to the other position when any of push buttons 54 is depressed. After this preliminary description of the scheme of operation of the code input and comparator stages, the physical arrangement of the coded program signal generator 44 will now be described.

In FIGS. 10–14 are shown the general arrangement of coded program signal generator 44 which includes multiple contact switch 192 which is, for example, a conventional multiple contact switch of a type similar to that described in U.S. Patent 2,935,577 having a latching bar 194 for accumulatively holding down any number of push buttons 54 at a time, for example, four in number. Latching bar 194 is released either by depression of reset button 196 or by actuating solenoid K–3 in a manner later described. Push button projections 180 on one side of switch 192 bear upon bar 182 whose projection 184 shown in FIG. 13 bears against latch 178 to permit a downward pressure of any of push buttons 54 to release feeler assembly 176 and allow it to be forced into contact with the surface of card 158 by tension spring 198 (FIG. 11) which draws lever 200 attached to feeler assembly 176 upwardly about pivot 202. The other push button projections 203 along the other side of switch 192 operate multiple contacts 205 constituting switches S–1 to S–10 of multiple contact switch 192. Switch S–23 which is of the microswitch type is shown in FIG. 13 bearing upon an upper surface of bar 182 allowing its operative condition to be changed when bar 182 is depressed by actuation of any one of push buttons 54.

Coded sheet or card 158 is inserted within a carriage or tray 204 which is longitudinally traversed under feelers or sensors 168 by a spring-operated capstan 206 which moves card 158 under sensors 168 and successively aligns rows of holes 162 No. "T" and 1 through 20 under sensors 168. A two-armed pawl 208 is actuated by solenoid K–4 to successively index rows 160 in lines with sensors 168 as comparator signals are generated. This automatically prepares code input unit 52 for the next signal when the proper code input for the immediate code pattern is set and actuated by depression of verification push button S–26.

Sensors or feelers 168 each include a finger 210 (FIG. 18) which is rotatably mounted within a slot 211 (FIG. 17) in sensor assembly 176. Resilient leaf springs 212 (FIGS. 18 and 19) bear against an upper surface of fingers 210 to bias them towards card 158, and any of them that are not permitted to pass through hole 162 into a groove 214 in index carriage 204 maintain switches S–11 to S–20 in normal position as shown in FIG. 20. However, the fingers 210 that drop through holes 162 transfer switches S–11 to S–20 to opposite normal position thereby requiring corresponding push buttons 54 to be depressed to complete the comparator circuit 172. Only switch S–20 is shown in FIG. 11, and the other switches S–11 to S–19 are behind it. Furthermore, switch S–24 at the rear of feeler assembly 176 senses its position to determine whether it is in contact or raised from code sheet 158.

Another switch S–22 senses the position of program sheet carrier 204 by contact with the raised edge 216 disposed along the side of tray 204. This determines when tray 204 is in the operative position and prevents operation of precision shaft rotation generator 72 unless it has one of rows 160—1 through 20 of sheet 158 in alignment with sensors 168. There is an additional switch S–25 as shown in FIG. 13 in association with door 56 closing the code program stage which is shown in FIG. 11. The functional relationship of door 56 in FIG. 11 and door 56 in FIG. 1 should be apparent, and it is locked to prevent a gasoline station owner from tampering with the code program stage or card and to prevent him from inspecting it to determine the code pattern. When door 56 is opened, for example, by the truck driver, S–25 actuates K–5 to raise sensor assembly 176 if not already up to prevent movement of card carriage 204 with the sensors down.

In FIGS. 10 and 13 are shown the elements connected with solenoid K–5 which lifts the feeler assembly 176 by drawing arm 218 pinned to shaft 228 which is rotatably mounted in support bracket 229 into contact with projection 220 from the side of sensor assembly 176. This permits projection 222 in the other side of sensor assembly 176 to be locked within projection 224 in latch 178. Furthermore, another arm 226 is pinned to shaft 228 which is rigidly secured to arm 218 as shown in FIG. 14 to cause connecting links 230 and 232 shown in FIGS. 13 and 14 to move when solenoid K–5 pulls arm 218 upwardly. This movement is transmitted to pawl 234 through pin 237, and slotted hole 239 withdraws locking pawl 234 which is rotatably mounted to a stationary portion 235 of the frame as shown in FIG. 13 from a groove 236 in reset locking counting device 238 which prevents more than three successive operations of reset button 196 without actuation of K–5 which results from a pulse from comparator 46. This counting action is accomplished by rotation of bar 240 about pivot 242 in response to a downward pressure applied at the end 244 of reset button 196. Bar 240 is also rotatably connected to actuating pawl 246 which is rotatably connected to arm 232 which causes its nose 248 to lift column 250 upwardly one groove each time reset button 196 is pressed. Locking pawl 234 can freely operate together with actuating pawl 246 by virtue of the lost motion provided by slotted hole 239. Arm 234 and pawl 246 are spring loaded by springs 266 and 268 respectively to keep them in their normal positions against locking column 250. The inclined upper edges 241 of rings 243 which separate grooves 236 help disengage locking pawl 234 upon each upward movement of column 250. Upon release of reset button 196, the nose 252 of locking pawl 234 falls into a groove 236 thereby locking column 250 in its raised position against the force of compression spring 254. Column 250 is raised into contact with opposite surface 256 of the fixed portion 258 of reset locking counting device 238 in three depressions of reset button 196. This locks the device and prevents further operation of the push buttons until an actuating pulse has been actuated by a service man who has access to door 56 within a locked portion of the unit such as code program section 50. Raising door 56 actuates switch S–25 to cause reset of locking device and raising of sensing assembly 176 clear of card tray 204 by energizing solenoid K–5 to draw feelers 168 out of slot 209 in plate 207 and retract arm 234 and pawl 246 to permit column 250 to drop so that push buttons 54 can again be depressed since reset button 196 has also been released.

In FIG. 20 is shown a schematic electrical diagram of code program signal generator and particularly the code input portion 52 and comparator portion 46. As previously described, switch contacts S–11 to S–20 are associated with the ten spring-loaded hole sensors 168 which read the row on card 158 under them, and they are shown in FIG. 20 in the position they assume when they are pressed against a card 158 having no holes at all in it. When there are holes in the card, the contacts actuated by pins which go through holes 162 will transfer to their other positions.

Switch contacts S–1 to S–10 are associated with the ten accumulatively locked code number push buttons 54, and they are shown in the undepressed position. When each button 54 is pressed, its contact transfers to the other position.

Normally-closed switch contact S–22 which bears against the carriage 204 is opened when the carriage is not in one of the positions where one of the rows 1 through 20 of indicia or holes will be aligned with sensing feelers 168. It is closed in all positions where the card is in operative relationship with the feeler assembly, or when the feeler assembly is over row T of card 158.

Switch contact S–23 which detects the position of bar 182 associated with push buttons 54 is shown in the position which it assumes when all push buttons 54 are in their undepressed positions. When any button 54 is pressed, S–23 transfers to its other position.

Switch contact S–24 which bears against the rear of feeler assembly 176 is shown in the position which it assumes when the feeler assembly is in its latched position which also means that all of the ten push buttons 54 are in the undepressed position. When any of push buttons 54 are depressed which releases sensor assembly 176 from latch 178, switch S24 transfers to its other position.

Switch contact S–25 associated with the access door 56 is shown in the position that it assumes when the door is closed which energizes the control circuit. When this door is opened for loading and removing card 158, S–25 transfers to its other position to actuate relay K–5 and retract the sensors from the card.

Normally-opened switch contact S–26 shown in FIG. 10 is a momentary spring return push button which is actuated after the four code number buttons 54 have been pressed to verify whether the proper code pattern has been established. If it has, the circuit will be completed through the comparator and code input stages; and a pulse will be delivered to additive input section 32 of counter assembly 28 to increase the number of gallons of gasoline available for dispensing. If indicator lamp I–1 lights when button S–26 is depressed, either the wrong four code number buttons 54 have been depressed, more than four buttons have been depressed, or less than four buttons have been depressed. The proper four code buttons must then be depressed after depressing reset button 196.

FIGS. 13–19 and 21–24 show various details of coded program signal generator 44. FIG. 13 shows a sensor assembly 176 in the released position that it assumes when one of the push buttons 54 has been depressed to release projection 222 from latch 178 by a downward movement of bar 182 transmitted to it through inclined bar extension 184. This permits individual sensing fingers 210 to read holes 162 as was previously and will be later described.

In FIG. 14, sensor assembly 176 is shown in the position that it assumes when it is being raised back into the latched condition within projection 224 of latching element 178 by the action of solenoid K–5 which draws arm 218 upwardly against projection 220 to raise sensor assembly 176 away from the surface of card 158.

Figure 17:
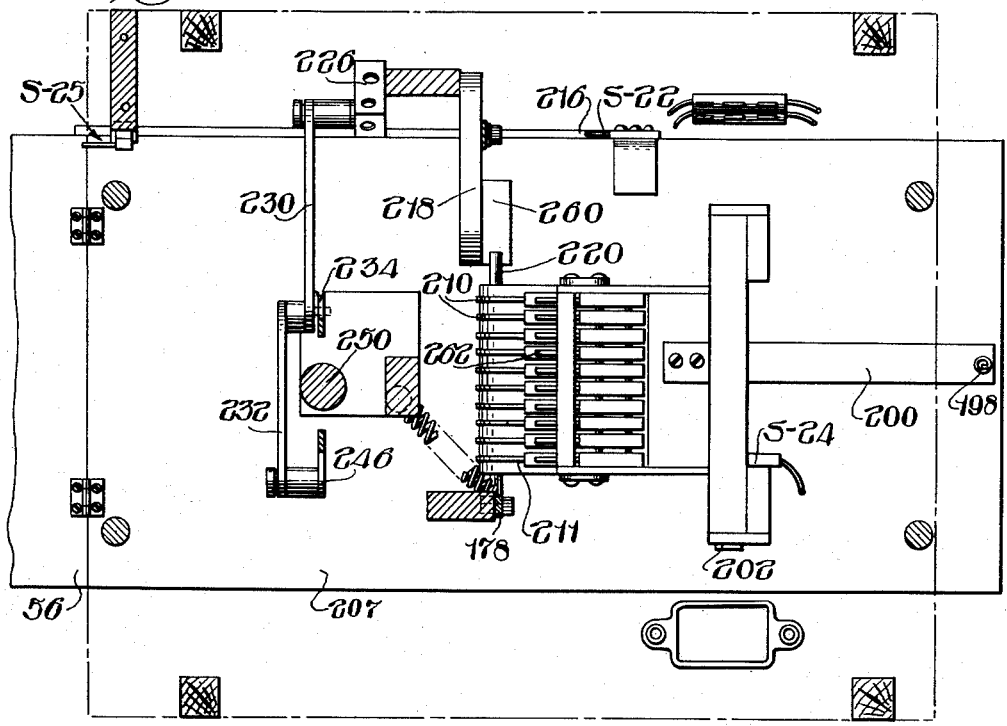
FIG. 17 is a cross-sectional view taken through FIG. 11 along the line 17—17.
Figure 18:
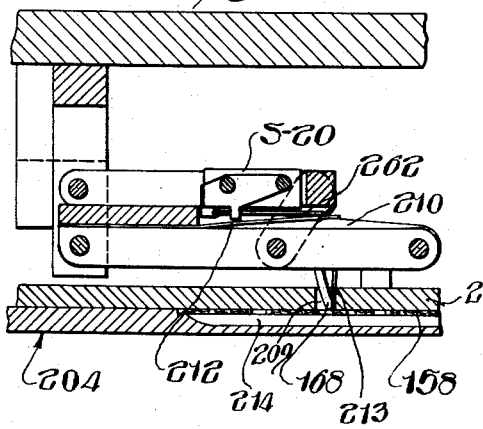
FIGS. 18 and 19 are enlarged views in elevation of portions of the sensor assembly shown in FIG. 13.

FIG. 17 shows the relative positions in plan of lifting arm 218 and its lifting surface 260 which contacts projection 220. FIG. 17 in conjunction with 18 and 19 also illustrates the details of the mounting of fingers 210 within slots 211 in assembly 176. FIG. 18 shows a finger 210 in an upwardly rotated position by the contact of its feeler 168 with the unbroken surface of a card 158. This raises leaf spring 212 against the actuating arm 262 of a switch such as S–20 to maintain it closed. FIG. 18 also shows a marking finger 213 which pierces, indents or marks card 158 as shown by holes 215 in FIG. 24 every time that feeler or sensor assembly 176 drops down upon it. This indicates that the marked code row has been utilized which is subject to verification by the supplier.

Figure 19:
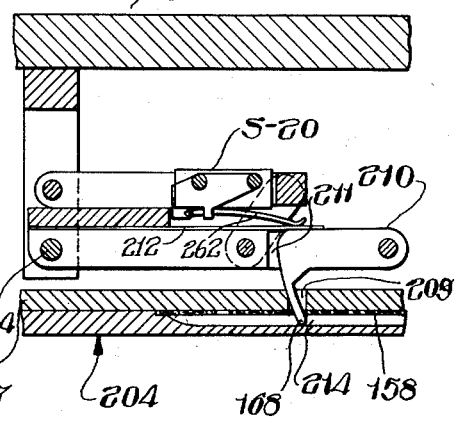

In FIG. 19, feeler 168 is shown extending through a hole 162 in card 158 and into one of grooves 214 on carrier tray 204 to allow S–20 to open. The entire assembly 176 is pivoted about shaft 264, and all illustrated portions of the assembly rotate upwardly and downwardly with it.

FIGS. 21 and 22 show details of the reset locking device 238 and the mode in which actuating pawl 246 and locking pawl 234 actuate column 250. Springs 266 and 268 respectively urge pawls 234 and 246 towards grooves 236 of column 250, and the resilient connection of these pawls to connecting rod 230 and link 232 permits them to be actuated as described. In FIG. 21 column 250 is shown in the fully raised or locked position into which it has been actuated by three successive movements of reset button 196 which raises the upper end 248 of actuating pawl 246 against the surface of column 250 adjoining grooves 236 by the rotation of bar 240 caused by the reaction of the lower end 270 of reset button 196 against it. This rotation of bar 240 together with the rotatable connection of pawl 246 to connecting rod 232, and bar 240 urges surface 248 of pawl 246 against successive annular rings 272 of column 250 to raise it into a locked position. After each of the raising movements, locking pawl 234, which is rotated away from column 250 during the upward movement of actuating pawl, is pushed back into engagement with column 250 by spring 266 to maintain it in the position to which it has been raised. These lifting and locking operations are facilitated by the rotatable connection of pawls 234 and 246 to connecting rod 230 and link 232. Release of pawls 234 and 246 to drop column 250 is accomplished when link 230 is pulled to the left by linkage from solenoid K–5.

FIG. 23 shows in detail the manner in which downward movement of any of push buttons 54 causes its projection 180 to depress bar 182. This rotates latch 178 away from projection 222 of assembly 176 thereby allowing it to be resiliently drawn into contact with card 158.

FIG. 24 shows a door 56 upon program stage 50 which permits a coded card 158 to be inserted into card tray 204 bearing grooves 214 over which any holes 162 are disposed to allow sensors 168 to drop an appreciable distance when detecting holes 162. Door 56 in FIG. 24 is substantially equivalent to door 56 shown in FIG. 1.

FIG. 25 shows an embodiment of this invention which can conveniently control the inventory of several different types of grades of fluids instead of the single fluid accommodated by the embodiment of this invention shown in FIG. 2. This multiple fluid system incorporates a single coded program signal generator 44 of the type shown in FIG. 2 which is associated through a selector switch 274 with several groups of dispensing units 16 and counter assemblies 28, for example, represented by counter assemblies 16A, B and C, respectively associated with counter assemblies 28A, B and C. Dispensing units 16A, B and C are, for example, individual dispensers for discharging separate grades of gasoline such as high, low and medium octane grades, or they may represent the metering sections of the components for pumping individual blends in blending dispensers which proportionately dispense blends of two different base fluids.

Individual signal generators 36 are connected to each of the dispensing units, and a detecting unit 60 is connected to each of counter assemblies 28A, B and C or their meters in the same manner previously described. Detecting units 60 are also connected to a disabling switch K-10A for each of the dispensing units 16A, B and C in the same manner previously described. This premits one coded program signal generator to provide an additive input into the counter assembly which maintains an instantaneous inventory of the amount of all of the types of fluid being dispensed from a particular gasoline station. The operation of the system shown in FIG. 25 is similar to that described with respect to the single fluid type system which is herein completely illustrated and described with the exception of the necessity of preliminarily adjusting selector switch 274 to connect coded program signal generator 44 with the counter assembly to which a triggering input is to be provided. This system would require the payment of different amounts in accordance with the price of the grade of gasoline for which the input is utilized, but the attendant complication in bookkeeping would not be prohibitive.

Operation

The operation of this system is very simply accomplished by incorporating the described apparatus and electrical circuits in units of the type schematically represented in FIG. 1. However, routine variations can obviously be made in the physical placement of the components as need for them arises.

This system permits a representative of the distributor, such as a truck driver, to insert a coded card 158 into a tray or carrier similar to 204 of program stage 50 by unlocking door 56 to which only representatives of the distributing gasoline company have access. By referring to the punched holes 162 in the first row of card 158, he can ascertain the proper code for setting the first input into counter assembly 28, and the first row 160 upon card 158 can be designated "T" as shown in FIG. 9 to indicate that it is a test pattern. When carrier 204 is in a position which does not align one of the operating rows 1-20 of holes 162 in line with sensors 168 such as in line with row "T," switch S-22 as shown in FIG. 12, reading surface 216 on carrier 204, is maintained opened to prevent a triggering input from being transmitted to element 72 of counter assembly 28. With card 158 in position "T," the truck driver presses the four buttons corresponding to the four holes punched in the "T" column and then presses the verify button S-26. If the equipment is operating properly, the buttons will reset and the carriage will advance to position 1, but no triggering pulse will be sent to counter assembly 28. Prior to verification, the driver must have closed door 56 to close interlock switch S-25 and permit energization of the verification circuit.

If the station owner has established credit, he can then obtain and set the first operative code pattern into the code input stage 52 by depression of the proper push buttons 54. This first code pattern may be conveyed to him either from the dispatcher of the distributor or directly from the truck driver. Should the truck driver by collusion inform the station owner of additional code patterns, this will easily come to the attention of the distributing company who can quickly take steps to remedy such defalcations. An absolute bar against this can be provided by entrusting the coded cards only to trustworthy personnel if necessary. The station owners must thereafter obtain each successive code in the program from the company dispatcher who has in his possession a duplicate to that inserted in the code program stage 50.

When the station owner needs additional quantities of gasoline and can establish credit for them, he phones the company dispatcher for the succeeding code for releasing the quantity to which his precision shaft rotation generator 72 of counter assembly 28 has been set, for example, to a three hundred gallon increment. He then depresses the proper push buttons 54. If the input into stage 52 corresponds to the code program on the current row of program stage 50, comparator 46 will transmit a triggering pulse to additive input section 32 of counter assembly 28 upon depression of verification button S-26. This causes precision rotation generator 72 to rotate its output shaft 74 through the proper angular displacement to set the hundreds wheel 78 of counting unit 30 ahead three units. It is then possible for dispensers 16 to deliver up to 300 gallons before the subtractive input to counting unit 30 from rotary ratchet solenoids 64 actuated by pulse generators 36 upon dispensers 16 bring counting unit 30 back to the null or zero condition. This cuts off power to the pumps 12 when this null condition is detected by detecting unit 60 and de-energization of relay-operated switch K-10A. The station operator is warned when less than one hundred gallons remain by the series connection of detecting switches S-28 and S-27 which respectively ascertain null or zero indications of the hundreds and thousands wheels of counting unit 30. Furthermore, the correlation of the subtractive and additive inputs into counting unit 30 through differential 76 permits the input of additive quantities at any time into counting unit 30 without stopping the operation of dispensers 16. This makes the unit extremely flexible in operation to permit more than one additive input to be set into counting unit 30 at a time and without requiring any of the dispensing units to be stopped.

The simplicity of connection of signal or pulse generators 36 to the dispensing units highly facilitates installation of this system upon any existing dispensers since the only connection that need be made with them can be accomplished by connecting pulse generators 36 to a shaft upon their computers or meters. Furthermore, the pump disabling system is easily connected to dispensers which incorporate pumps within them as well as to disabling systems of practically any other type including those connected to a remote pump of the type described herein.

The flexibility of this system is further enhanced by provision of increment adjusting section 84 including selector switch S-35 which permits the increments to be varied in accordance with the particular needs of any station owner. Larger stations may accordingly utilize input increments as much as 600 gallons, for example, or even more, while smaller stations may purchase increments of as little as 100 gallons, or possibly even less at one time.

Should a station owner make a mistake in putting in the code upon push buttons 54 or if he attempts to guess the proper code, reset locking device 238 will allow him three mistakes before it jams the push button mechanism and subjects him to the embarrassment of having a representative of the distributor come out and unlock door 56 to manually clear coded signal generator 44. This clearing is automatically accomplished each time the unit advances to the next program by actuation of solenoid K-3 which releases accumulatively locked push buttons 54, and it can be manually accomplished by depression of the manual advance button S-36 shown in FIG. 1 as well as by actuation of reset button 196 if it is not locked.

What is claimed is:

1. An inventory control system for fluid being dispensed from a supply means through dispensing units incorporating metering means comprising a motorized counter assembly, said counter assembly including a counting unit and additive and subtractive input sections connected to said counting unit, signal generators connected to the metering means of said dispensers and to said subtractive input section for subtracting an indication of the quantity of fluid delivered through said dispensers from said counting unit, a coded program signal generator including a code program stage and an input stage connected by a comparator stage which provides an output signal when said code input stage is adjusted to the same code pattern to which said code program stage is set at the same time, said comparator stage being connected to said additive input section of said counter for actuating it to set into said counter an indication of an amount of fluid which is being made available for dispensing from said supply means, a disabling means connected with said dispensers which is capable of being actuated to prevent them from dispensing fluid, detecting means operatively associated with said counter for ascertaining when it is in a null condition, and said detecting means being connected to said disabling means for shutting off said dispensers when said counter is in said null condition.

2. An inventory control system as set forth in claim 1 wherein said signal generators are pulse generators, said metering means includes a computer section incorporating movable shafts, and said pulse generators are connected to said movable shafts for providing pulses to said subtractive input section of said counter in accordance with the quantity of fluid being delivered through said dispenser.

3. An inventory control system as set forth in claim 2 wherein said pulse generators incorporate a toggle switch arrangement to prevent them from being stopped in a signalling condition.

4. An inventory control system as set forth in claim 1 wherein said detecting means comprises detecting switches operatively associated with all of the wheels of said counter in a manner which actuates said switches when all of said wheels are in a null condition, circuit means connecting said switches in a parallel arrangement, and said circuit means being connected to actuate a relay-operated switch in the power supply to said dispensers for cutting off electrical power to them when all of said counter wheels are in a null condition.

5. An inventory control system as set forth in claim 4 wherein said detecting switches are connected to said wheels of said counter through cam and follower means which actuate said switches when said wheels are in a null condition.

6. An inventory control system as set forth in claim 5 wherein said counter includes a thousands, a hundreds, a tens and a units wheel, said detecting switches operatively associated with said hundreds and thousands wheels being connected in series within said parallel circuit, a warning signal means being provided, and said series-connected detecting switches being connected to said signal means for actuating it when they are both in a null condition to provide an indication that less than a hundred units of dispensable fluid remain.

7. An inventory control system as set forth in claim 1 wherein said code program stage comprises a carrier element, indexing means operatively associated with said carrier elements for moving said carrier element to successive positions, a replaceable coded sheet being mounted upon said carrier element and bearing successive rows of coded indicia, said code input stage comprising a multiple contact means which is capable of being set into an arrangement corresponding to said coded indicia upon said sheet, said comparator stage comprising groups of sensing feelers which traverse the rows of said coded indicia upon said sheet, and circuit means for providing an output signal from said comparator stage to said additive input stage of said counter when said arrangement set into said coded input stage corresponds with the row of indicia upon said sheet being contacted by said feelers.

8. An inventory control system as set forth in claim 7 wherein a piercing finger is mounted upon said comparator stage for motion with said sensing feelers whereby said coded sheet is pierced adjacent each row of coded indicia contacted by said feelers for indicating that said row has been utilized.

9. An inventory control system as set forth in claim 7 wherein said coded program stage is enclosed in a manner which makes it accessible only to a representative of the supplier of fluid to said supply means.

10. An inventory control system as set forth in claim 9 wherein an interlocking switch is provided upon the enclosure surrounding said coded program stage to prevent the transmission of output signals from said comparator stage when said enclosure is opened.

11. An inventory control system as set forth in claim 7 wherein said multiple contact means is a multiple switch incorporating accumulative locking means for maintaining a predetermined number of contacts actuated together, release means being provided upon said switch for releasing said accumulatively held contacts together, and locking means being associated with said multiple contact-switch for jamming said release means upon a predetermined number of erroneous setting of said multiple contacts and subsequent releases to prevent undue speculative operation of said multiple contact means and permit correction of a routine error.

12. An inventory control system as set forth in claim 11 wherein said locking means is a ratchet and a pawl-driven column having a predetermined number of steps through which it can be actuated from said release means without jamming, and a release means being connected to said ratchet and pawl means for releasing said pawl each time said comparator delivers a signal to said input stage.

13. An inventory control system as set forth in claim 12 wherein motor-operated lifting means are associated with said feeler assembly for lifting them from said sheet when said comparator is providing a signal to said input stage, and said lifting means being connected to said pawl for releasing said column whenever said comparator is signalling to said input stage.

14. An inventory control system as set forth in claim 7 wherein said comparator stage includes individual switches disposed upon each of said feelers, said individual switches being arranged in a parallel circuit with corresponding elements of said multiple contacts, and said circuit being arranged to transmit a signal whenever those of said multiple contacts are actuated which correspond to the feelers which coincide with the pattern of coded indicia upon the row of said sheet disposed in line with said feelers.

15. An inventory control system as set forth in claim 14 wherein said multiple switch means comprises series-connected normally-opened contacts, said individual feeler switches comprise series-connected normally-closed contacts with bridging connections between corresponding multiple contacts and individual feeler switches, and a limiting device is provided for preventing more than a predetermined number of said multiple contact means from being operated at one time.

16. An inventory control system as set forth in claim 15 wherein means are provided for contacting all of said feelers with said sheet and maintaining contact as long as any of said multiple switches are actuated by connection to said multiple switch means.

17. An inventory control system as set forth in claim 16 wherein said feelers are mounted upon an assembly which is biased toward said sheet, a latch means being associated with said assembly for holding said assembly away from said sheet, and a motor-operated lifting device being connected to said feeler assembly for lifting said feelers into the latched condition removed from said sheet as said carriage is being traversed within its program from one row of indicia to the next.

18. An inventory control system as set forth in claim 7 wherein said additive input section comprises a precision shaft rotation generator, and said precision shaft rotation generator being connected to said counter in the additive direction for setting into it an indication of a predetermined quantity of fluid in response to a signal from said comparator stage.

19. An inventory control system as set forth in claim 18 wherein said precision shaft rotation generator is a stepping switch.

20. An inventory control system as set forth in claim 18 wherein a variable angular setting means is associated with said precision shaft rotation generator, and a selector switch means being connected to said variable angular setting means to permit an operator to preselect the number of units to be set into said counter for each signal from each comparator.

21. An inventory control system as set forth in claim 18 wherein said stepping switch is connected through an additive differential to the hundreds wheel of the counter to minimize the revolutions of the counter for each indication of quantity set into it and to simplify the precision shaft rotation generator.

22. An inventory control system as set forth in claim 7 wherein said subtractive input section incorporates discrete step rotation generators connected to each of said signal generators which are connected to said dispenser metering means, an additive differential means being connected to sum the outputs from said rotation generators, and a subtractive linkage connecting said summed outputs from said rotation generator into said counter.

23. An inventory control system as set forth in claim 1 wherein said counting unit incorporates a units, a tens, a hundreds and a thousands wheel, transfer gears between said units and said tens wheels and between said hundreds and said thousands wheels, an input shaft being directly connected to said hundreds wheel for setting quantities into said counter, an additive and subtractive differential being connected to additively drive said input shaft which is connected to said hundreds wheel, and motion-transmitting means subtractively connecting the output of said tens wheel to said differential for subtracting the total of said subtractive outputs from said units and tens wheels through said differential from said hundreds wheel.

24. An inventory control system as set forth in claim 23 wherein said input shaft to said hundreds wheel is coaxially introduced through the center of said thousands wheels.

25. An inventory control system as set forth in claim 23 wherein an auxiliary shaft is rotatably mounted externally to said wheels as part of said motion-transmitting means, and said motion-transmitting means also including a gear train engaging said tens wheel to drive said auxiliary shaft.

26. An inventory control system as set forth in claim 25 wherein freely rotatably geared cams are mounted upon said auxiliary shaft and engaged with said tens and thousands wheels for detecting their angular positions.

27. An inventory control system as set forth in claim 23 wherein cam and follower means are mounted upon the shafts driving said units and hundreds wheels of said counter.

28. An inventory control system as set forth in claim 27 wherein detecting switches are connected to said cam means and said geared cams for being actuated when said wheels are in a null condition.

29. An inventory control system as set forth in claim 14 wherein said parallel-connected pairs of individual switches and corresponding multiple contacts are all connected in series, said switches and contacts incorporate double throw operating means which complete the circuit through all of said parallel pairs when corresponding elements are actuated, and said double throw operating means opening the circuit through any pair in which a multiple contact not corresponding to an actuated feeler is operated.

30. An inventory control system as set forth in claim 1 wherein multiple groups of dispensers, signal generators, counter assemblies, detecting means and disabling means are provided in intra-connection with each other for different fluids; a single coded program signal generator being provided, and a selector means connecting said coded program signal generator with said multiple groups for permitting selective actuation of said counter assemblies by said coded program signal generator.

31. An inventory control system as set forth in claim 30 wherein said selector means is a selector switch.

References Cited in the file of this patent

UNITED STATES PATENTS

| | | |
|---|---|---|
| 2,247,480 | Damon et al. | July 1, 1941 |
| 2,281,373 | Naes | Apr. 28, 1942 |
| 2,577,115 | Eichner | Dec. 4, 1951 |